(12) United States Patent
Stamenic et al.

(10) Patent No.: US 10,186,912 B2
(45) Date of Patent: Jan. 22, 2019

(54) PICKUP COIL DESIGN FOR TIGHT SPACES AND ASYMMETRICAL COUPLING

(71) Applicant: QUALCOMM Incorporated, San Diego, CA (US)

(72) Inventors: Milenko Stamenic, Munich (DE); Edward L. Van Boheemen, Munich (DE); Simon Islinger, Munich (DE); Wojciech Adam Chlebosz, Munich (DE); Stefan Raabe, Munich (DE); Alberto Garcia Briz, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/027,055

(22) Filed: Sep. 13, 2013

(65) Prior Publication Data

US 2015/0077053 A1 Mar. 19, 2015

(51) Int. Cl.
*H02J 7/02* (2016.01)
*H02J 7/00* (2006.01)
(Continued)

(52) U.S. Cl.
CPC .............. *H02J 50/70* (2016.02); *B60L 11/182* (2013.01); *H01F 27/36* (2013.01); *H01F 27/365* (2013.01); *H01F 38/14* (2013.01); *H02J 5/005* (2013.01); *H02J 7/0042* (2013.01); *H02J 7/025* (2013.01); *H02J 50/12* (2016.02); *H02J 50/40* (2016.02); *H02J 50/90* (2016.02); *B60L 2270/147* (2013.01)

(58) Field of Classification Search
CPC .................................. B60L 9/16; H02J 7/025

USPC .................................................. 320/108, 109
See application file for complete search history.

(56) References Cited

U.S. PATENT DOCUMENTS

2006/0217058 A1* 9/2006 Staszesky .............. G08C 17/02
455/3.01
2008/0129246 A1* 6/2008 Morita et al. ................. 320/108
(Continued)

FOREIGN PATENT DOCUMENTS

CN 101681719 A 3/2010
CN 103168405 A 6/2013
(Continued)

OTHER PUBLICATIONS

Partial International Search Report—PCT/US2014/054825—ISA/EPO—dated Mar. 20, 2015.
(Continued)

*Primary Examiner* — David V Henze-Gongola
*Assistant Examiner* — Tarikh Rankine
(74) *Attorney, Agent, or Firm* — Knobb, Martens, Olson & Bear, LLP

(57) ABSTRACT

Systems and methods for wireless power transmission are described herein. In one aspect, a charging pad to transfer power wirelessly comprises a power antenna assembly configured to receive wireless power. The power antenna assembly is configured to charge the battery based on the received wireless power. The charging pad further comprises a ferrite layer assembly. The charging pad further a shielding layer defining a shape configured to receive a part of the host device and/or conform to a shape of a host device. The shielding layer can define a notch or can define a concave shape.

40 Claims, 9 Drawing Sheets

(51) Int. Cl.
*H01F 38/14* (2006.01)
*B60L 11/18* (2006.01)
*H02J 5/00* (2016.01)
*H02J 50/70* (2016.01)
*H02J 50/12* (2016.01)
*H02J 50/40* (2016.01)
*H02J 50/90* (2016.01)
*H01F 27/36* (2006.01)

(56) References Cited

U.S. PATENT DOCUMENTS

| | | | |
|---|---|---|---|
| 2009/0058358 A1 | 3/2009 | Inoue et al. | |
| 2010/0181842 A1* | 7/2010 | Suzuki | H02J 5/005 307/104 |
| 2010/0253092 A1 | 10/2010 | Lai et al. | |
| 2010/0308939 A1* | 12/2010 | Kurs | 333/219.2 |
| 2011/0018498 A1 | 1/2011 | Soar | |
| 2011/0285349 A1 | 11/2011 | Widmer et al. | |
| 2012/0025602 A1* | 2/2012 | Boys et al. | 307/9.1 |
| 2012/0098486 A1* | 4/2012 | Jung | 320/108 |
| 2012/0119697 A1* | 5/2012 | Boys | B60L 11/182 320/108 |
| 2012/0217111 A1 | 8/2012 | Boys et al. | |
| 2012/0235636 A1 | 9/2012 | Partovi | |
| 2012/0248893 A1 | 10/2012 | Teggatz et al. | |
| 2012/0256585 A1 | 10/2012 | Partovi et al. | |
| 2013/0181667 A1* | 7/2013 | Takeshita et al. | 320/108 |
| 2013/0300359 A1* | 11/2013 | Nakamura et al. | 320/108 |
| 2014/0183966 A1* | 7/2014 | Suzuki et al. | 307/104 |

FOREIGN PATENT DOCUMENTS

| | | | |
|---|---|---|---|
| EP | 1760830 A1 | 3/2007 | |
| EP | 2172952 A1 | 4/2010 | |
| JP | 2008294385 A | 12/2008 | |
| JP | 3169797 U | 8/2011 | |
| JP | 2012517118 A | 7/2012 | |
| KR | 20130024757 A | 3/2013 | |
| WO | WO-2008140333 A2 | 11/2008 | |
| WO | WO-2010090539 A1 | 8/2010 | |
| WO | 2012018268 A1 | 2/2012 | |
| WO | WO-2013039500 A1 | 3/2013 | |
| WO | WO 2013165421 A1 * | 11/2013 | H01Q 1/2266 |

OTHER PUBLICATIONS

International Search Report and Written Opinion—PCT/US2014/054825—ISA/EPO—dated Jun. 29, 2015.

* cited by examiner

PICKUP COIL DESIGN FOR TIGHT SPACES AND ASYMMETRICAL COUPLING

FIELD

The present invention relates generally to wireless power. More specifically, the disclosure is directed wireless power transfer to remote systems.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a charging pad to transfer power wirelessly. The charging pad comprises a power antenna assembly configured to receive wireless power. The power antenna assembly is further configured to charge a battery based on the received wireless power. The charging pad further comprises a ferrite layer assembly defining a gap extending height-wise through the ferrite layer assembly. The charging pad further comprises a shielding layer defining a notch. The notch can protrude into the gap of the ferrite layer assembly.

Another aspect of the disclosure provides a device for wireless power transfer. The device comprises means for receiving wireless power from a wireless field. The means for receiving is configured to charge a battery based on the received wireless power. The device further comprises means for altering the wireless field comprising a gap extending height-wise through the means for altering. The device further comprises means for shielding the wireless field and for defining a notch. The notch can protrude into the gap of the means for altering.

Another aspect of the disclosure provides a method of charging a battery. The method comprises receiving wireless power from a wireless field using an antenna assembly to provide power to charge the battery. The method further comprises altering the wireless field using a ferrite layer assembly. The ferrite layer assembly is wirelessly coupled to the antenna assembly. The ferrite layer assembly defines a gap extending height-wise through the ferrite layer assembly. The method further comprises shielding the wireless field using a shielding layer assembly. The shielding layer assembly defines a notch. The notch protrudes into the gap of the ferrite layer assembly.

Another aspect of the disclosure provides a charging pad to transfer power wirelessly. The charging pad comprises a concave power antenna assembly configured to receive wireless power, wherein the charging pad is configured to charge a battery based on the received wireless power. The charging pad further comprises a concave ferrite layer assembly operatively coupled to the concave power antenna assembly. The charging pad further comprises a shielding layer defining a concave exterior surface.

Another aspect of the disclosure provides a method of charging a battery. The method comprises receiving wireless power from a wireless field using a concave power antenna assembly to provide power to charge the battery. The method further comprises altering the wireless field using a concave ferrite layer assembly. The method further comprises shielding the wireless field using a shielding layer assembly. The shielding layer defines a concave exterior surface.

Another aspect of the disclosure provides a device of receiving wireless power. The device comprises means for receiving wireless power from a wireless field and for defining a concave receiving layer. The means for charging is configured to charge a battery based on the received wireless power. The device further comprises means for altering the wireless field at the means for receiving. The device further comprises means for shielding the wireless field and for defining a concave form factor.

Figure 1:
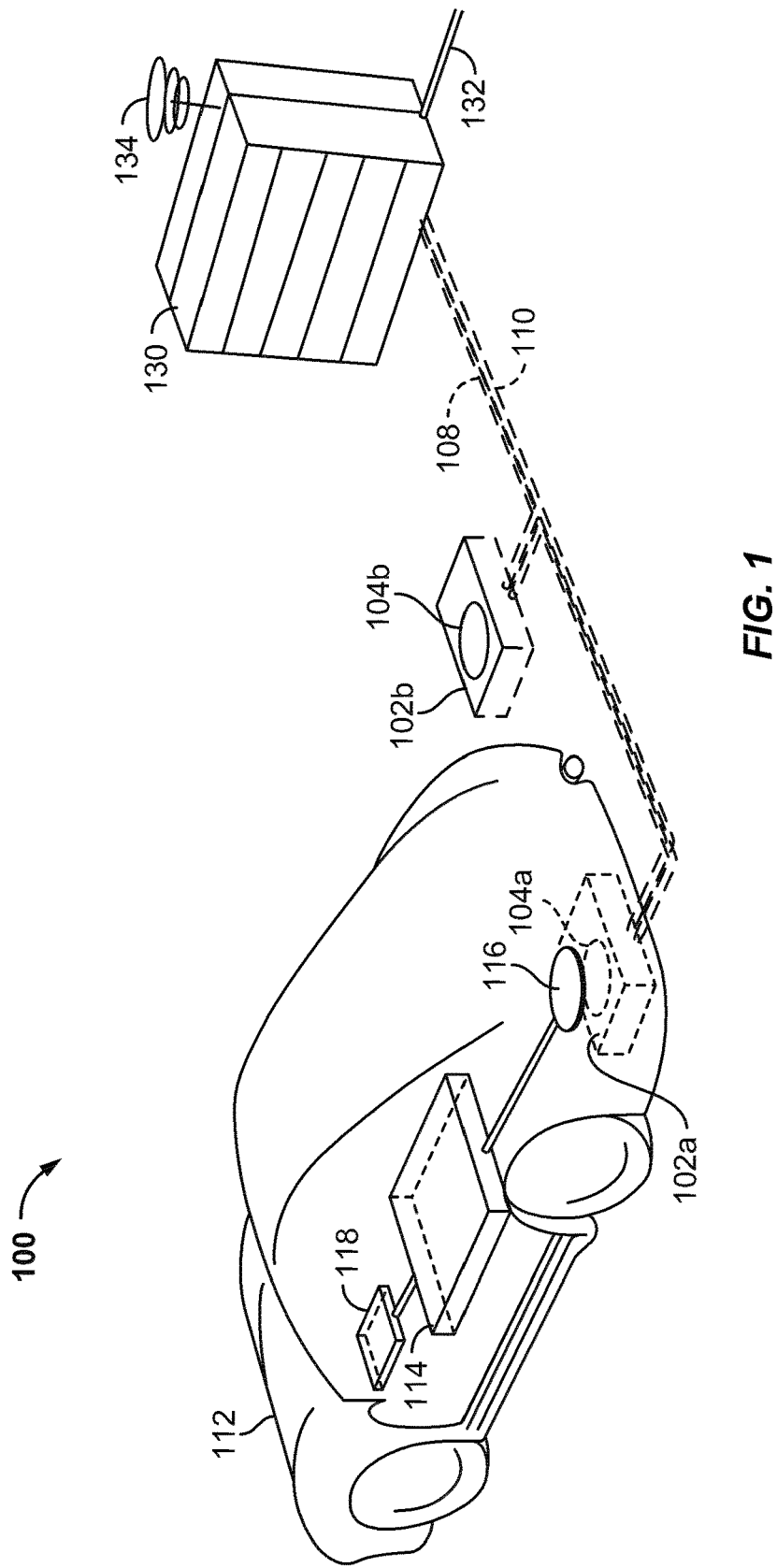
FIG. 1 is a functional block diagram of an example wireless power transfer system.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments. It will be apparent to those skilled in the art that the exemplary embodiments may be practiced without these specific details. In some instances, well known structures and devices are shown in block diagram form in order to avoid obscuring the novelty of the exemplary embodiments presented herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Inductive power transfer (IPT) systems are one way for the wireless transfer of energy. In IPT, a primary (or "transmitter") power device transmits power to a secondary (or "receiver") power receiver device. Each of the transmitter and receiver power devices includes inductors, typically an arrangement of coils or windings of electric current conveying media. An alternating current in the primary inductor produces a fluctuating electromagnetic field. When the secondary inductor is placed in proximity to the primary inductor, the fluctuating electromagnetic field induces an electromotive force (EMF) in the secondary inductor, thereby transferring power to the secondary power receiver device.

In electric vehicle and plug-in hybrid vehicle IPT systems the primary power device may be situated on the ground and may be known as a "base" device or power pad. The secondary power device may be situated on the electric vehicle and may be known as a "pick-up" device, vehicle pad, or charging pad.

Vehicle pads may be difficult to incorporate into certain vehicles. Such vehicles may include original equipment manufacturer (OEM) non-electric vehicles to be retrofitted with wireless charging capabilities, and vehicles having tight space requirements. In one example, the vehicle may have fixed and/or movable parts about a location desirable for mounting the charging pad. The fixed parts may protrude into an area desirable for mounting the charging pad. Still other parts, even if not normally protruding into an area desirable for mounting the charging pad, may be at risk of colliding with the charging pad during operation of the vehicle because the part is movable, causing damage to the charging pad and/or interfering with the operation of the vehicle when contacted. In addition, the configuration of the vehicle may make it difficult to mount the charging pad levelly at a desirable height.

Thus, there remains a need for improved charging pad for integration into vehicles having tight and/or irregular spaces.

FIG. 1 is a diagram of an exemplary wireless power transfer system 100 for charging an electric vehicle 112, in accordance with an exemplary embodiment. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases, the near field may correspond to a region that is within about ½π of wavelength of the base system induction coil 104a (and vice versa for the electric vehicle induction coil 116) as will be further described below.

Local distribution 1130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zigzag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a either transfers power to the electric vehicle 112 or the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

In some other use cases, power flow in the reverse direction may only be a small amount, as part of a process to improve alignment of the transmitter and receiver devices, or to identify which transmitter device is appropriately placed for transferring power to the receiver device.

It will be therefore be understood that the terms "transmitter", "receiver", "primary" and "secondary" and the like are used herein to refer to the normal uses of the components of the wireless power transfer system when used for transferring power from the power supply to a load or a remote system, such as, but not limited to, the electric vehicle—i.e., from the transmitter or primary device to the receiver or secondary device. Therefore the "transmitter" may also be used to receive power and the "receiver" may also be used to transmit power. The use of these terms, although referring to the normal sense of operation of certain components of the system for ease of understanding, does not limit the invention to any particular operation of such components.

Figure 2:
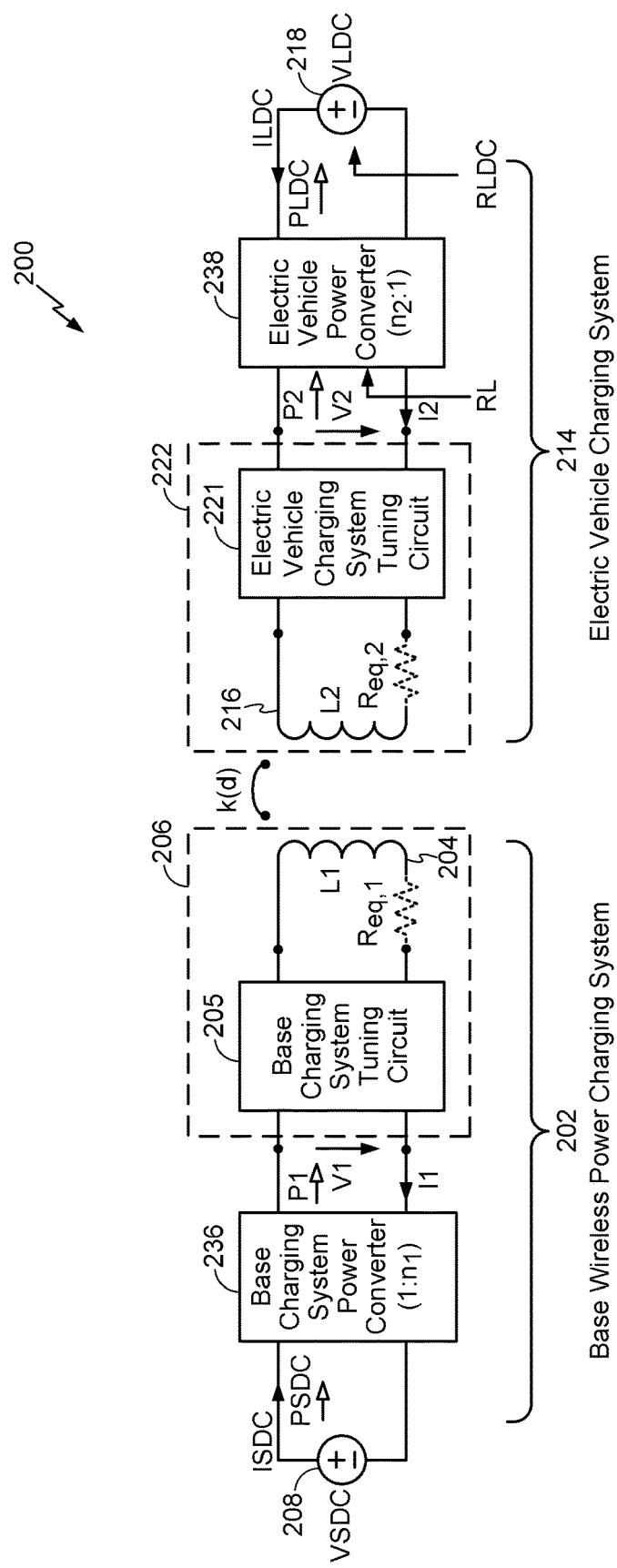
FIG. 2 is a functional block diagram of example components that may be used in the wireless power transfer system of FIG. 1.

FIG. 2 is a schematic diagram of exemplary components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency.

A resonant frequency may be based on the inductance and capacitance of a transmit circuit including an induction coil (e.g., the base system induction coil 204) as described above. As shown in FIG. 2, inductance may generally be the inductance of the induction coil, whereas capacitance may be added to the induction coil to create a resonant structure at a desired resonant frequency. As a non-limiting example, a capacitor may be added in series with the induction coil to create a resonant circuit (e.g., the base system transmit circuit 206) that generates an electromagnetic field. Accordingly, for larger diameter induction coils, the value of capacitance for inducing resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non-limiting example, a capacitor may be placed in parallel between the two terminals of the induction coil (e.g., a parallel resonant circuit). Furthermore, an induction coil may be designed to have a high quality (Q) factor to improve the resonance of the induction coil.

The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including a base charging system tuning circuit 205. The base charging system tuning circuit 205 may be provided to form a resonant circuit with the base system induction coil 204 at desired frequency. The tuning circuit 205 may include one or more reactive tuning components (e.g., one or more capacitors) coupled to the base system induction coil 204. The reactive tuning components may be electrically connected in a series or parallel configuration with the base system induction coil 204 or any combination of a series and parallel configuration.

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 216. In this case, the base system induction coil 204 and electric vehicle induction coil 216 may become coupled to one another such that power may be transferred to the electric vehicle receive circuit 222 including an electric vehicle charging system tuning circuit 221 and electric vehicle induction coil 116. The electric vehicle charging system tuning circuit 221 may be provided to form a resonant circuit with the electric vehicle induction coil 216 at a desired frequency. The turning circuit 221 may include one or more reactive tuning components (e.g., one or more capacitors) coupled to the electric vehicle induction coil 216. The reactive tuning components may be electrically connected in a series or parallel configuration with the electric vehicle induction coil 216 or any combination of a series and parallel configuration. The mutual coupling coefficient resulting at coil separation is represented by element k(d). Equivalent resistances $R_{eq,1}$ and $R_{eq,2}$ represent the losses that may be inherent to the induction coils 204 and 216 and any anti-reactance capacitors that may, in some embodiments, be provided in the base charging system tuning circuit 205 and electric vehicle charging system tuning circuit 221 respectively. The electric vehicle receive circuit 222 including the electric vehicle induction coil 316 and electric vehicle charging system tuning circuit 221 receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

It will be understood that for the sake of simplicity above descriptions and the block diagram of FIG. 2 have been limited to a single channel wireless power transmitter and a single channel wireless power receiver, meaning that there is a single power source driving a single primary induction coil and there is a single secondary induction coil (pick-up) delivering power to a single power sink e.g., a rectifier. However, the wireless power transfer system 200 may be a multi-channel-type system comprising of multiple (aggregated) power sources driving multiple primary induction coils, and multiple secondary induction coils delivering power to multiple power sinks (e.g., rectifiers). Dual-channel configurations may be used to operate a system using coil arrangements, in accordance with certain embodiments described herein.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to decouple the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 214, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the electromagnetic field and generates output power for storage or consumption by the electric vehicle 112. As described above, in some embodiments, the base system induction coil 204 and electric vehicle induction coil 216 are configured according to a mutual resonant relationship such that when the resonant frequency of the electric vehicle induction coil 216 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency and/or at lower power. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi-turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used. In this specification the term "coil" may be used in the sense of a conductive structure or having a number of turns of electrically conducting material that all wind around a single central point. The term "coil arrangement" is used to mean any winding arrangement of conducting material, which may comprise a number of "coils". In some exemplary embodiments, Litz wire may be used to form the coil arrangements.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The coil may also be referred to as an "antenna" of a type that is configured to wirelessly output or receive power. Loop (e.g., multi-turn loop) antennas may be configured to include an air core or a physical core such as a ferrite core. An air core loop antenna may allow the placement of other components within the core area. Physical core antennas including ferromagnetic or ferrimagnetic materials may allow development of a stronger electromagnetic field and improved coupling.

Inductive power transfer (IPT) systems as described in part with reference to FIGS. 1 and 2 provide one example of wireless transfer of energy. In IPT, a primary (or "transmitter") power device transmits power to a secondary (or "receiver") power receiver device. Each of the transmitter and receiver power devices includes inductors, typically an arrangement of coils or windings of electric current conveying media. An alternating current in the primary inductor produces an alternating magnetic field. When the secondary inductor is placed in proximity to the primary inductor, the alternating magnetic field induces an electromotive force (EMF) in the secondary inductor, thereby transferring power to the secondary power receiver device.

As stated, it is desirable to have a charging pad effective for integration into tight and/or irregular spaces. In accordance with one specific embodiment, one example aspect described herein may include a shielding pad defining a notch or groove on the surface of the charging pad to receive a part of the vehicle for tighter integration. For example, as explained below in further detail, the notch can be configured to receive, e.g., a member of the suspension system such that the notch helps to provide space to fit the charging pad. In accordance with a second specific embodiment, one example aspect described herein may include a charging pad having a fold such that the charging pad is mountable to a non-flat surface. Embodiments herein are described in the context of charging pads for receiving wireless power, but will be applicable to other types of devices that, additionally or alternatively, may be configured to transmit or generate wireless power (e.g., a wireless transmitter). For a non-limiting example, the charging pads described herein may be situated on a vehicle and configured to wirelessly transmit power from a vehicle battery to a base pad, such as a wireless receiver of a smart grid that is configured to dynamically distribute power between devices.

Figure 3:
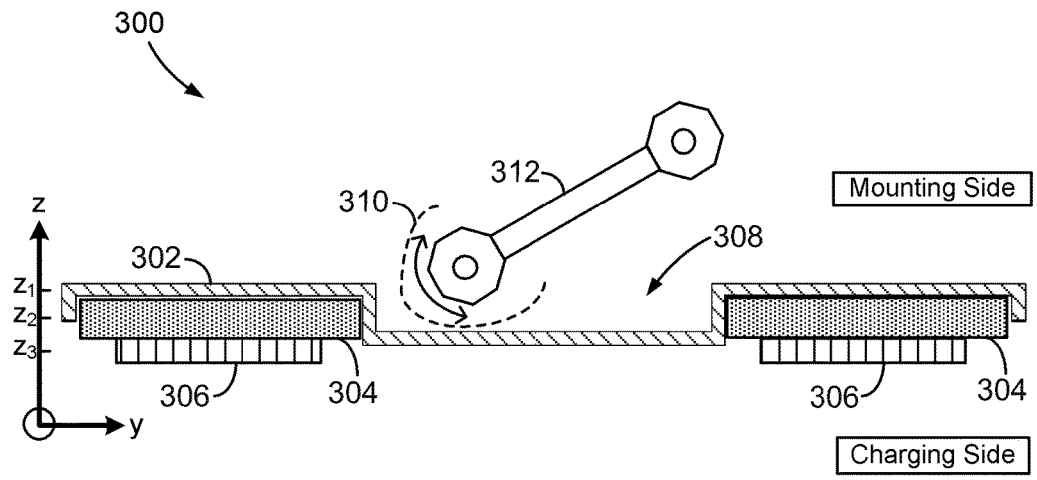
FIG. 3 is a side-view of a charging pad in accordance with an example embodiment.

FIG. 3 is a side-view of a charging pad 300 in accordance with an example embodiment. The charging pad 300 can include a shielding layer 302, a ferrite layer assembly 304, and an antenna assembly 306. The shielding layer 302 can define a notch or pocket 308 configured to protrude into a gap defined by the ferrite layer assembly 304. The charging pad 300 may be situated in close proximity to an operational boundary, space, or envelope 310 that defines possible positions of an extraneous member 312. For example, the extraneous member 312 can include an engine or suspension part or mount protruding into an area where the charging pad 300 is to be mounted.

In an aspect, the charging pad 300 may correspond to an electric vehicle wireless charging system 114 including an electric vehicle induction coil 116 as descried above with reference to FIGS. 1 and 2. For example, in electric-vehicle and plug-in hybrid vehicle IPT systems, the secondary power device or charging pad 300 may be situated on the electric vehicle. These devices are used to receive wireless power from the base wireless charging system 102a to a vehicle 112 and to charge a battery unit 118 (FIG. 1).

As shown in the illustrated embodiment, the shielding layer 302 and the ferrite layer assembly 304 can at least partially overlap. For example, the shielding layer 302 is formed at least partially on a first x-y plane at height $z_1$ in the z dimension, and the ferrite layer assembly 304 is formed on a second x-y plane at a height $z_2$, where the shielding layer 302 and the ferrite layer assembly 304 share some common x-y coordinates. In other words, when viewed looking into the x-y plane of the charging pad 300 (for example, in the z-direction), the shielding layer 302 extends over the ferrite assembly 304 so as to at least partly cover the ferrite assembly 304. In addition, the ferrite layer assembly 304 and the antenna assembly 306 can at least partially overlap. For example, the antenna assembly 306 is formed on a third x-y plane at a height $z_3$, where the ferrite layer 304 and the antenna assembly 306 share some common x-y coordinates. That is, when viewed looking into the x-y plane of the charging pad 300, the ferrite layer assembly 304 extends over the antenna assembly 306 so as to at least partly cover the antenna assembly 306. It should be understood that the charging pad 300 may include intervening layers in addition to the shielding layer 302, the ferrite layer assembly 304, and the antenna assembly 306.

The shielding layer 302 can form at least part of a mounting side for incorporating the charging pad with the electric vehicle, and the antenna assembly 306 can form at least part of a charging side for communicating wireless power. In one example embodiment, the mounting side of the charging pad 300 can be can mounted to the underside of an electrical vehicle such that the shielding layer 302 is positioned between the electric vehicle and the ferrite layer assembly 304, and charging side of the charging pad 300 is orientated towards the ground so that the charging pad 300 can be situated above a base pad for charging a battery.

The shielding layer 302 can be configured to inhibit transmission of wireless fields (e.g., magnetic flux) from the charging side to the mounting side across the shielding layer 302, as well as inhibiting the electrical vehicle from interfering with the operation of the charging pad 300. For example, the shielding layer 302 can aid in inhibiting components of the electrical vehicle from coupling with and affecting the received wireless field. In one embodiment, the shielding layer 302 can include substantially magnetically impermeable material, such as an electrically conductive back plate.

Accordingly, example embodiments described herein can achieve low emission levels (e.g., EMF exposure levels below ICNIRP'98 reference levels or radio frequency interference levels below limits as defined by European Norm EN 300330 or FCC part 15) while performing charging of electric vehicles. For example, the shielding layer 302 can include a conductive back plate and any extension thereof that may cover the magnetic structures and/or the antenna structures of the charging pad 300. The shielding layer 302 may help to suppress wireless emission levels at critical locations, including the vehicle's interior (e.g., passenger compartment). To this end, magnetic suppression may relate to magnetic field boundary conditions at the surface of the shielding layer 302. For example, magnetic field components perpendicular to a conductive surface, such as the shielding layer 302, do not substantially exist. In one way, for example, a magnetic field at the surface may be cancelled by the induced eddy currents (as approximately modeled by Lenz's law).

In addition, the shielding layer 302 can be configured to include the notch 308 for reducing the space used by the charging pad. For example, the shielding layer 302 can define at least a portion of an exterior shape of the charging pad 300. For example, the shielding layer 302 can define the exterior surface of the mounting side. As such, the notch 308, protruding into the charging pad 300, can define a pocket or indentation on the mounting side surface, thereby reducing the volume of the charging pad 300 and can thus provide additional space, for example, by receiving the extraneous member 312. For example, the extraneous member 312 may be fixed or movable (e.g., as defined by the operational space 310) in a way that can protrude into a space where the charging pad 300 is to be mounted. Without the notch 308, the charging pad 300 should be mounted below the operational envelope 310 of the extraneous member 312 in order to avoid collision with the extraneous member 312 and/or to avoid damage during operation. With the notch 308, the charging pad 300 can be mounted in a way that the operational boundary 310 fits within the notch 308. Accordingly, the notch 308 can aid in mounting the charging pad higher (and, e.g., improving ground clearance of the vehicle) and/or in protecting the charging pad 300 from being damaged.

The ferrite layer assembly 304 can include material having substantially high magnetic permeability for guiding, altering, shaping, and/or enhancing the magnetic field received by the power antenna assembly. For example, the ferrite layer assembly 304 can include one contiguous magnetically permeable material, such as but not limited to ferrites, or a plurality of tiles of magnetically permeable material. In operation, the amount of wireless power received by the charging pad can be based on (e.g., proportional to) the volume of the magnetically permeable material of the ferrite layer assembly 304.

In one aspect of various example embodiments described herein, the ferrite layer assembly 304 can define a gap extending heightwise through the ferrite layer assembly 304 for receiving the notch 308 of the shielding layer 302 and thereby providing space internally for the notch 308. The gap may extend completely or partially through the ferrite layer assembly 304. For example, a gap extending partially through the ferrite layer assembly 304 can include a second notch for receiving the notch 308 of the shielding layer 302. Accordingly, at least a portion of the charging pad 300 can have reduced thickness.

Since the ferrite layer assembly 304 can aid in guiding, altering, shaping, and/or enhancing a magnetic field or flux received by the antenna assembly 306, the gap of the ferrite layer assembly 304 can affect performance. In some circumstances, the gap can adversely affect power transmission if not properly arranged. Accordingly, in one aspect of example embodiments described herein, the ferrite layer assembly 304 can be arranged to define the gap for receiving the notch 308 in a way that mitigates the adverse effects of the gap.

The power antenna assembly 306 can be configured to receive wireless power. For instance, the wireless power can be generated from an external base pad and received by the antenna assembly 306. In turn, the charging pad 300 (e.g., by way of the antenna assembly 306) can be configured to charge a battery based on the received wireless power. In one embodiment, the power antenna assembly 306 can include one or more coil antennas. In one embodiment, two or more coil antennas can be utilized for improving robustness of charging pad-base pad misalignment, e.g., as described later in further detail in connection with FIG. 8. For example, power antenna assemblies having two or more coils are disclosed in U.S. patent application Ser. No. 13/786,231, filed Mar. 5, 2013, titled "COIL ARRANGEMENTS IN WIRELESS POWER TRANSFER SYSTEMS FOR LOW ELECTROMAGNETIC EMISSIONS," which is hereby incorporated by reference in its entirety.

Figure 4:
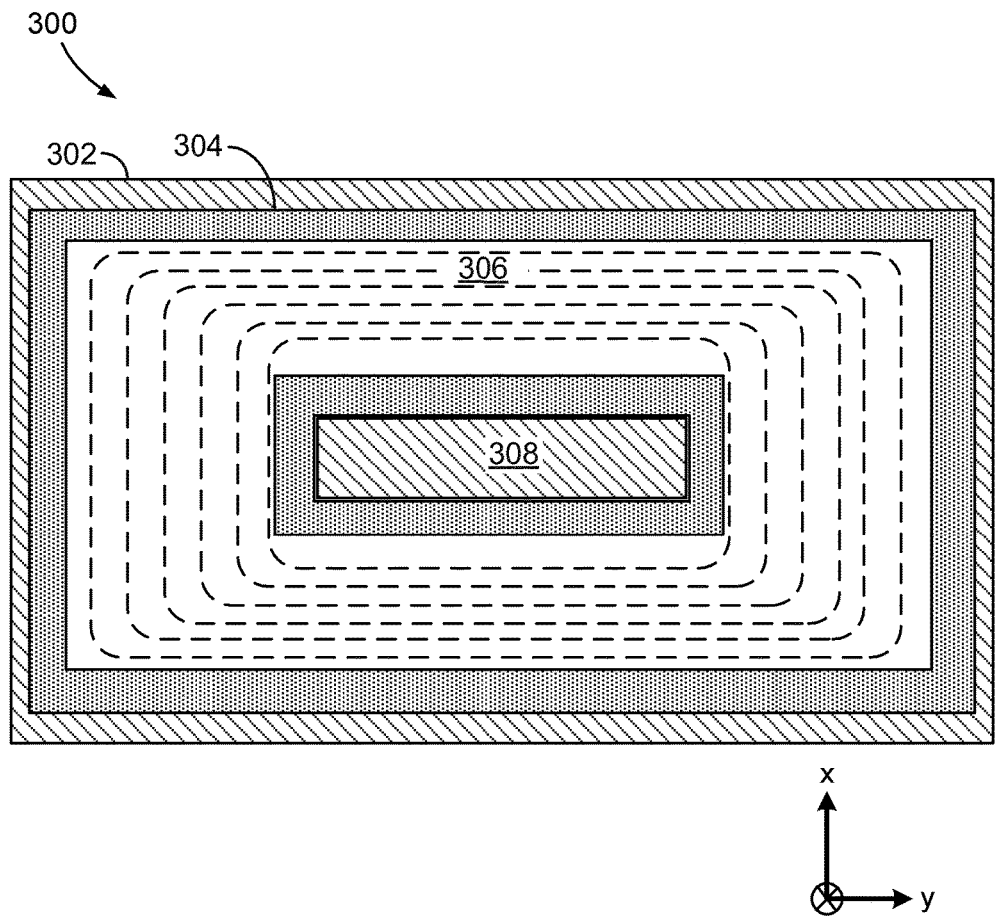
FIG. 4 is a top-view of the charging pad of FIG. 3, in accordance with an example embodiment.

FIG. 4 is a top-view of the charging pad 300 of FIG. 3, in accordance with an example embodiment. Elements of FIG. 4 common to FIG. 3 share common reference indicia, and only differences between the figures are described herein for the sake of brevity.

In the illustrated embodiment, the shielding layer 302 forms a structure that overlaps the ferrite layer assembly 304 and the coil antenna assembly 306 in the x-y subspace, as described above in connection with FIG. 3. Moreover, the ferrite layer assembly 304 overlaps the antenna assembly 306 in the x-y subspace, as described above in connection with FIG. 3. The illustrated example embodiment of the antenna assembly 306 forms a coil antenna. The gap of the ferrite layer assembly 304 is situated under the interior space of the coil antenna and receives the notch or pocket 308 of the shielding layer 302. It will be appreciated that overlapping includes overlapping from above as well as from below. It will be further appreciated that overlapping includes partially overlapping and completely overlapping. It will be further appreciated that shapes other than rectangular coil antenna winding are encompassed by the disclosure herein.

In one aspect, various example embodiments described herein relate to mitigating the adverse impact of the gap in the ferrite layer 304 on the wireless field. For example, the gap may adversely weaken the coupling of the charging pad 300 with a wireless field. In the illustrated embodiment of FIG. 3, the charging pad 300 has a rectangular-shaped coil antenna assembly 306 and the gap is positioned in the center of the rectangular winding. It will be appreciated that other applicable locations, such as off-centered locations, of the gap can be chosen. Moreover, the gap defined in the ferrite layer 304 need not be an interior gap (e.g., a gap formed from ferrite on all sides). In addition, the gap of the illustrated embodiment has a length dimension (e.g., the longest dimension) orientated with a length dimension of the antenna coil assembly 306. In one aspect of certain embodiments, as described in further detail below in connection with FIGS. 8 and 9, the predominate (e.g., longest) dimension of the gap is aligned in parallel with a wireless flux direction, such as the predominate electromagnetic (e.g., magnetic) flux direction. It will be appreciated that other gap orientations with respect to the antenna coil assembly 306 and/or wireless field can be chosen.

Figure 5:
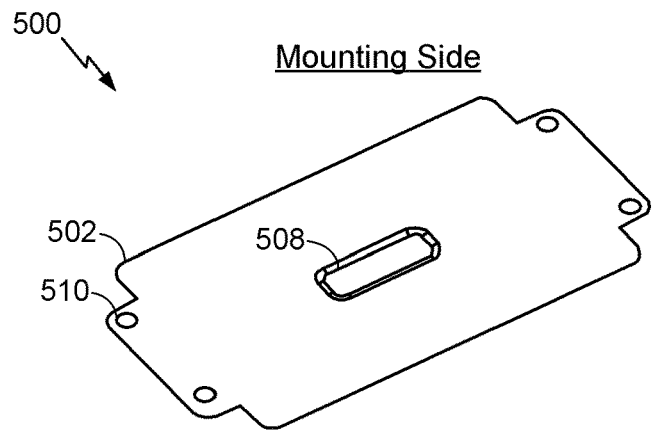
FIG. 5 is a perspective view of a mounting side of a charging pad in accordance in with an example embodiment.

FIG. 5 is a perspective view of a mounting side of a charging pad 500 in accordance in with an example embodiment. The charging pad 500 includes a shielding layer 502. The shielding layer 502 can define a notch or pocket 508 and can include one or more mounting points, such as a hole 510, for mounting the charging pad 500 to a host device, such a vehicle.

As stated, in one example embodiment the charging pad 500 may be mounted to the underside of an electric vehicle. For example, the shielding layer 500 can provide a structure to mechanically couple to the underside of the electric vehicle. To this end, the mounting points such as the hole 501 provide a way to secure the shielding layer and, in turn, the charging pad 500 to the electric vehicle by way of bolts, screws, tacks, and the like connectors and/or adhesives, or by way of welding methods. Accordingly, the shielding layer 502 can provide structural support for mechanical mounting and/or protection.

As stated, the shielding layer 502 can inhibit radiation the wireless field. In one example embodiment, the charging pad 500 can be mounted in close proximity to moving and/or rotating electromagnetically conductive parts. In another example embodiment, the charging pad 500 can be mounted in close proximity to a passenger compartment. In these embodiments, among other embodiments, it can be desirable to prevent the wireless field from passing through the charging side to the mounting side or vehicle side. Accordingly, the shielding layer 502 not only can provide structural support for mechanical mounting and protection, the shielding layer 502 has electromagnetic properties to shield and/or isolate wireless fields from the charging side from interacting with objects on the mounting side of the charging pad 500.

As stated, the notch 508 defined on the mounting-side surface (e.g., the vehicle-facing surface) of the shielding layer 502 protrudes inward with respect to the charging pad 500. In particular embodiments, the notch 508 defines a pocket or groove on the exterior surface of the shielding layer 502. Accordingly, the notch 508 can provide additional space for receiving objects, such as, but not limited to, a part of the vehicle, on the mounting side.

Figure 6:
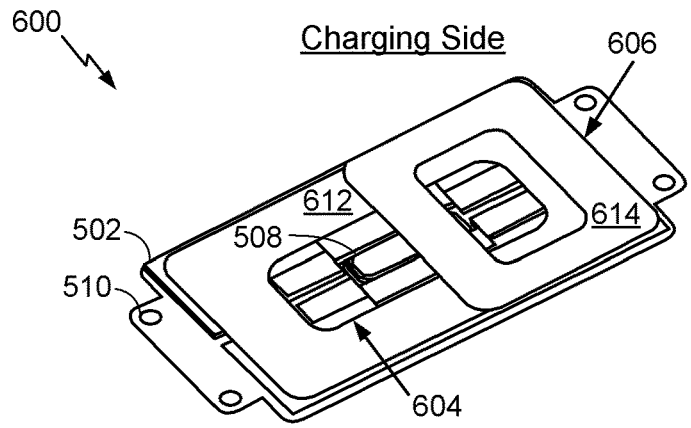
FIG. 6 is a perspective view of a charging-side of the charging pad of FIG. 5, in accordance with an example embodiment.

FIG. 6 is a perspective view of a charging-side of the charging pad 500 of FIG. 5, in accordance with an example embodiment. Elements of FIG. 6 common to FIG. 5 share common reference indicia, and only differences between the figures are described herein for the sake of brevity. The charging pad 500 can further include a ferrite layer assembly 604, an antenna assembly 606. The antenna assembly 606 can include first and second coil antennas 612, 614.

In the illustrated embodiment of FIG. 6, the ferrite layer assembly 604 is positioned between the shielding layer 502 and the antenna assembly 606. The ferrite layer assembly 604 can be formed from a plurality of ferrite tiles, as shown. The tiles of the ferrite layer assembly 604 can be arranged to define a gap providing space into which the notch 508 can protrude.

The antenna assembly 606 can include one or more coils, e.g., the first and second coils 612, 614. As stated, incorporating a plurality of coils can aid in enhancing wireless pickup from a base pad. For example, the coils can be configured to wirelessly couple different polarizations. As such, the plurality of coils can increase the likelihood that at least one coil of the plurality of coils can effectively pickup the respective polarity of the wireless field generated by the base pad. In particular, one such configuration is described in further detail later in connection with FIGS. 7 and 8.

Figure 7:
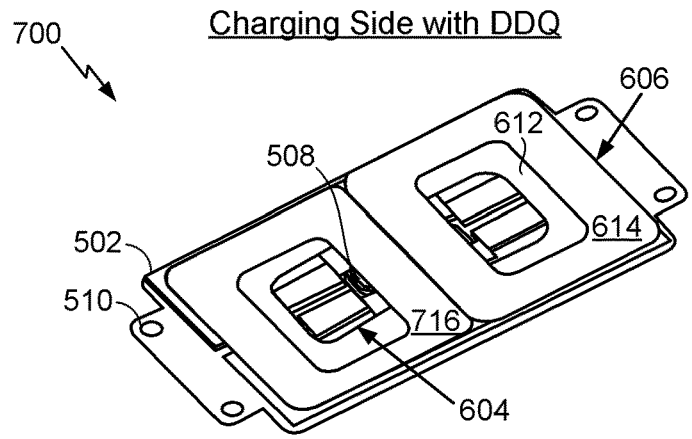
FIG. 7 is a perspective view of a charging-side of the charging pad of FIG. 5, in accordance with an example embodiment.

FIG. 7 is a perspective view of a charging-side of the charging pad 500 of FIG. 5, in accordance with an example embodiment. Elements of FIG. 7 common to FIGS. 5 and 6 share common reference indicia, and only differences between the figures are described herein for the sake of brevity. The antenna assembly 606 can further include a third coil 716 in addition to the first and second coils 612, 614.

The antenna assembly 606 of the illustrated embodiment includes a Double-D Quadrature ("DDQ") configuration. For instance, the antenna assembly 606 includes the first coil 612. The first coil 612 can form the Quadrature ("Q") coil for receiving a substantially vertically polarized magnetic moment. In addition, the antenna assembly 606 can include the second coil 614 wound in a first direction and the third coil 716 coplanar with the second coil 614 and wound in a second direction opposite the first direction. The first and second coils 614, 616 can form a Double-D ("DD") configuration for receiving a substantially horizontally polarized magnetic moment. The first coil 612 at least partially overlaps the second coil 614 and at least partially overlaps the third coil 716. In addition or in the alternative, the first coil 612 can be substantially magnetically decoupled from the second and third coils 614, 716. For example, the second and third coils 614, 716 are positioned with respect to the first coil 612 such that the neighboring edges of the second and third coils are position above about the center of the first coil. Accordingly, the DDQ coil arrangement can be configured to receive both a vertically and horizontally polarized magnetic moments.

Figure 8:
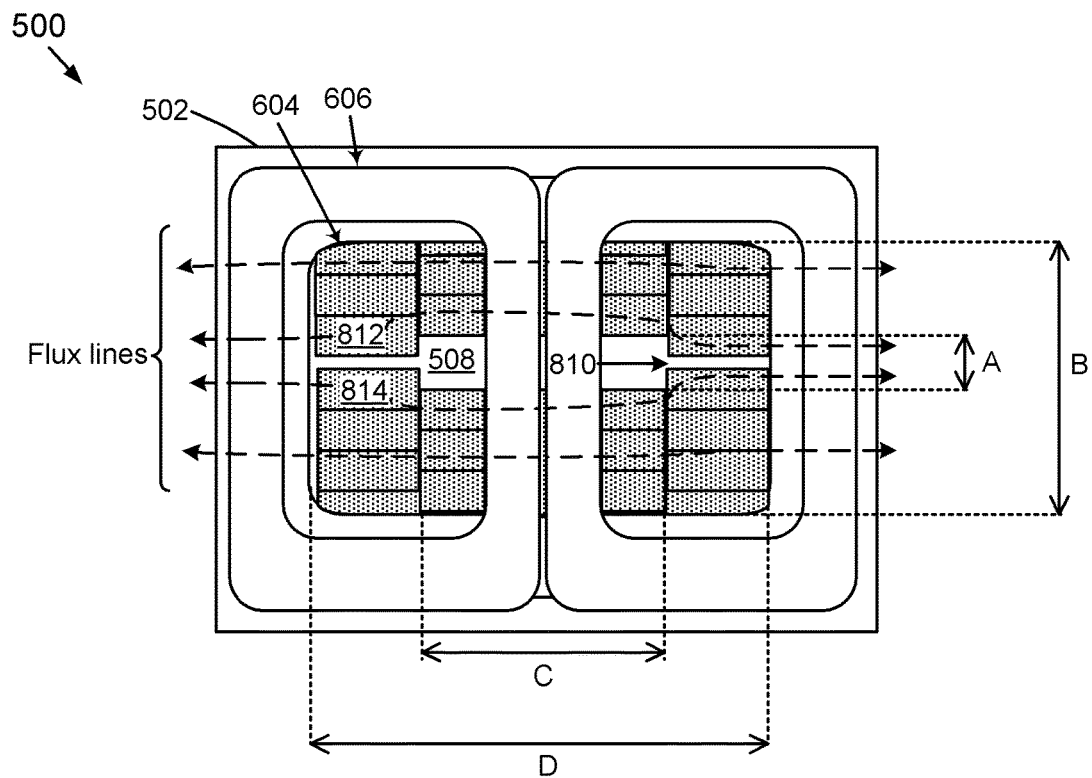
FIG. 8 is a top-view of a charging pad including flux lines, in accordance with an example embodiment.

FIG. 8 is a top-view of the charging pad 500 including flux lines of FIG. 7, in accordance with an example embodiment. Elements of FIG. 8 common to FIG. 7 share common reference indicia, and only differences between the figures are described herein for the sake of brevity. Furthermore, various reference indicia of elements of FIG. 8 common to FIG. 7 have been omitted in FIG. 8 for the sake of clarity.

In the illustrated embodiment, the antenna assembly 606 has an inner coil width (with respect to the quadrature coil) labeled as "B" in FIG. 8. In addition, the antenna assembly 606 has an inner coil length (with respect to the quadrature coil) labeled as "D." Herein, the term "length" can be used to refer to the longer dimension (e.g., the horizontal dimension of FIG. 8) of the two dimensions forming the plane of the charging pad 500, whereas the term "width" can be used to refer to the shorter dimension (e.g., the vertical dimension).

The ferrite layer assembly 604 of the charging pad 500 can further define a channel 810 formed by an arrangement of the plurality of ferrite tiles, such as tiles 812, 814. In the illustrated embodiment, the channel 810 extends longitudinally or lengthwise from the gap (or the notch 508). In one aspect, the channel 810 can be used for housing and/or routing wires of the antenna assembly 606. The channel 810 may have a shorter width than the gap. For example, in one embodiment, the channel 810 may have a width of less than about 25% of the width of the gap or the notch 508.

In operation, the charging pad 500 can be configured to receive a wireless field along a predominate direction. For example, the antenna assembly 606 can be polarized respect to a particular direction. The flux direction that provides a strong coupling with the charging pad 500 can be referred to as the polarized flux direction. In the illustrated embodiment, the flux lines of FIG. 8 can correspond to the polarized flux direction.

The ferrite layer assembly 604 can be configured to define the gap such that the length of the gap or notch 508 (e.g., the length is labeled as "C" in FIG. 8) is aligned along or orientated with the polarized flux direction. In the illustrated embodiment, the length of the notch 508 is aligned with the polarized flux lines at the center of the Q-coil winding. It will be appreciated that other gap locations and positions can be selected.

The gap or notch 508 can have a length aligned with the length of the charging pad 500. Additionally or alternatively, the length C of the notch 508 can be less than the inner coil length D of the charging pad 500. In one embodiment, the length C is less than about 95% of length D. In another embodiment, the length C is about 10% to about 90% of the length D. It will be appreciated that any applicable length C can be selected, e.g., up to the inner coil length D.

Wireless flux may be inhibited from flowing directly over the notch 508. Accordingly, the length of the notch 508 may have less impact than the width A of the gap or notch 508. In one embodiment, the width A of the notch 508 can be less than about 30% of the inner coil width B of the charging pad 500. In another embodiment, the width A of the notch 508 can be selected from a range of about 5% to about 35% of the inner coil width B of the charging pad 500. It will be appreciated that a reduced width A of the gap or notch 508 can improve wireless power transmission. It will further be appreciated that in some embodiments that a width of the notch above 30% can have a substantial impact on magnetic coupling. In addition, in one embodiment the length C of the gap or notch 508 can be up to the internal length of the quadrature coil without substantially reducing the effectiveness of the charging pad 500.

The ferrite layer assembly 604 can be configured to define the channel 810 such that the lengthwise or longitudinal dimension of the channel 810 is aligned along or orientated with the polarized flux direction. In the illustrated embodiment, according to an example embodiment, the length of the channel 810 is aligned with the polarized flux lines, extending across the lengthwise centerline of the Q-coil antenna. It will be appreciated that other locations and orientations of the channel 810 can be selected.

The channel 810 can have a length aligned with the length of the charging pad 500. Additionally or alternatively, the length of the channel 810 can be less than the inner coil length D of the charging pad 500. In one embodiment, the length of the channel 810 can be less than about 95% of length D. In another embodiment, the length of the channel 810 can be about 10% to about 90% of the length D. It will be appreciated that any applicable length of the channel 810 can be selected. In one embodiment, the width of the channel 810 can be less than about 30% of the inner coil width B of the charging pad 500. In another embodiment, the width of the channel 810 can be selected from a range of about 5% to about 35% of the inner coil width B of the charging pad 500.

In some embodiments, the notch 508 may extend along a longitudinal centerline of the charging pad 500 and/or may be symmetrical about a lateral (e.g., width-wise) centerline. In addition, as shown in FIG. 8, the notch 508 can be formed as one contiguous gap or space, or by two or more separate gaps or spaces. For example, the gap of the ferrite layer 605 may be defined by two or more locations of the ferrite layer, the two or more locations being symmetric about the lateral centerline of the Q-coil winding and/or a lateral centerline of the charging pad 500. Accordingly, the notch 508 can be formed from two or more indentations in the shielding layer 502 that protrudes into the two or more gaps of the ferrite layer 604. Forming the notch 508 about a longitudinal centerline of the charging pad 500 and/or symmetrically about a lateral centerline may improve wireless coupling efficiency.

In order to compensate for the loss of ferrite material due to the gap, additional ferrite material may be added to other regions of the ferrite layer assembly 504. In one embodiment, the thickness of at least certain portions of the ferrite layer assembly 504 can be increased so that the total volume of ferrite material of the ferrite layer assembly 504 remains constant as compared to a ferrite layer assembly 504 without a gap. For example, ferrite material equaling about the volume of the gap can be added to the ferrite layer surrounding the gap, forming a portion of the ferrite layer assembly 604 having increased height or thickness relative to another portion of the ferrite layer assembly 604. In one embodiment, the portion having additional ferrite material can have twice the thickness of uncompensated portions of the ferrite layer. The portion of the ferrite layer assembly 604 having increased thickness can be symmetric about the lateral centerline of the charging pad 500.

Figure 9:
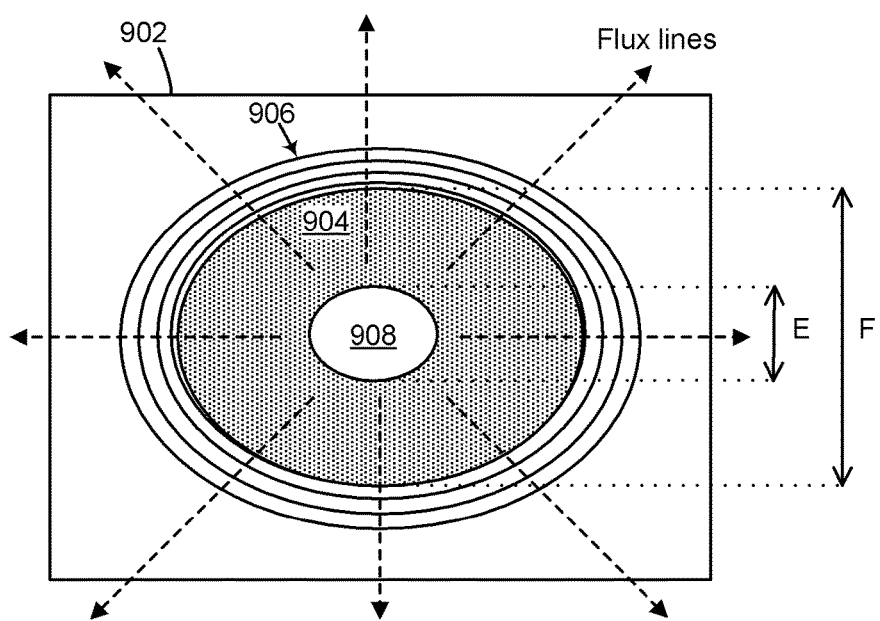
FIG. 9 is a top-view of a charging pad including flux lines, in accordance with an example embodiment.

FIG. 9 is a top-view of a charging pad 900 including flux lines, in accordance with an example embodiment. The charging pad 900 can include a shielding layer 902, a ferrite layer assembly 904, and an antenna assembly 906. The shielding layer 902 can define a notch or pocket 908, e.g., that protrudes into the charging pad 900.

In the illustrated embodiment, the circular coil antenna configuration can receive magnetic flux that is directed radially. In other words, there is no predominant flux direction as described in connection with the embodiment of FIG. 8. The charging pad 900 includes the notch 908 shaped as a uniform circle, but can also be shaped as, e.g., a regular polygon. The notch diameter E should be as small as practical, such as less than about the inner diameter F of the coil antenna. In some embodiments, having notch diameter E larger than 30% of the inner diameter F of the coil may have a detrimental effect on magnetic coupling.

Certain vehicles may have an uneven surface for mounting a charging pad. For example, due to space restriction, parts of the vehicle may crowd the desired location for situating the power pad. For example, a drive system may include differential and axle assemblies that result in an underbody surface of the vehicle that has bend. In particular, the mounting area may be level with the ground near the axles, but bends upwards near the forward portion of the vehicle to provide the desired ground clearance. If a flat charging pad is mounted levelly at the desired location, then the charging pad can protrude away from the vehicle surface about the forward potion of the vehicle and interfere with the ground clearance of the vehicle. Thus, there is a need for charging pads for tights and/or irregular spaces.

Figure 10:
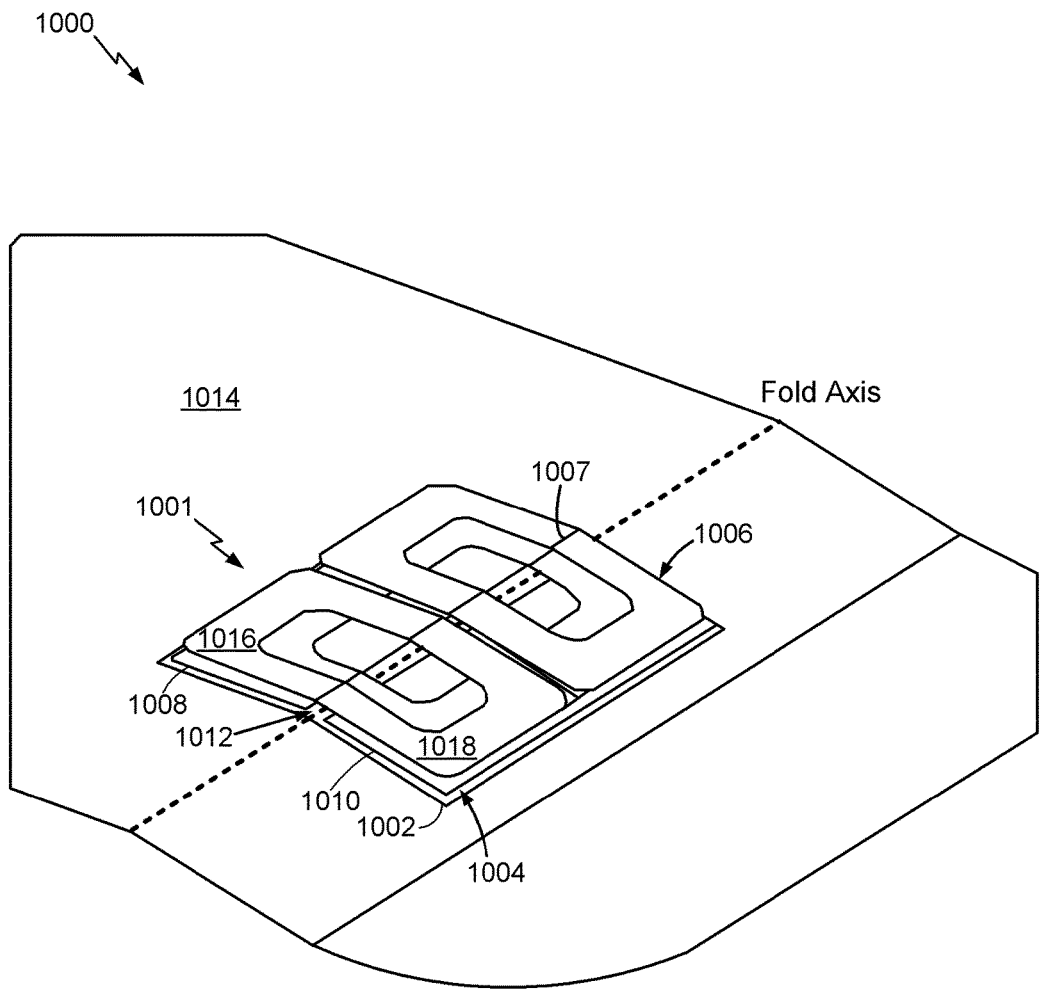
FIG. 10 is a perspective-view of a charging pad system, in accordance with an example embodiment.

FIG. 10 is a perspective-view of a charging pad system 1000, in accordance with an example embodiment. The charging pad system 1000 can include a charging pad 1001 comprising a shielding layer 1002, a ferrite layer assembly 1004, and an antenna assembly 1006 configured to have a concave shape or form factor, such as having a fold 1007 across an axis. The ferrite layer assembly 1004 can also include a first portion 1008 and a second portion 1010 of ferrite material forming a concave shape. Additionally or alternatively, the first and second portions 1008, 1010 of ferrite material may define a channel or gap 1012 therebetween and extending longitudinally across the charging pad 1001. The charging pad 1001 can be configured to mount to a host device, such as an underside of a vehicle 1014.

As shown in the illustrated embodiment of FIG. 10, the concave shape of the charging pad 1001 can aid in improving mechanical integration (e.g., with a vehicle) in a limited and/or irregular space. Examples of concave shapes include, but are not limited, shapes having one or more folds or bends along one or more axis, as well as curved portions, such that the charging pad has an exterior portion that is bent or curved inward. It will be appreciated that a folded surface can include a partially folded surface—e.g., the folded surface need not have two portions that overlap. Embodiments herein are described in the context of concave charging pads for receiving wireless power, but will be applicable to other types of devices that, additionally or alternatively, may be configured to transmit or generate wireless power (e.g., a wireless transmitter), and/or are formed having non-concave shapes.

In one aspect, the underside of the vehicle 1014 may have an uneven surface available for mounting the charging pad. For example, in the illustrated embodiment the, the underside has a bend creating two surfaces that meet at an angle. Accordingly, the charging pad can have a concave shape to match the contour of the underside. In one embodiment, the antenna assembly 1006 includes at least one coil having a bend or a fold 1007 such that the coil has a first coil section 1016 formed along a first plane and a second coil section 1018 formed along a second plane. The first and second planes may not be coplanar, thus resulting in a fold angle where the first and second coil section meet. In one example embodiment, the fold angle between the two first and second planes can be about 12 to 16 degrees. It will be appreciated, however, that other applicable fold angles can be selected.

In one embodiment, the ferrite material can have a concave shape for integration with the antenna assembly 1006 and the underside of the vehicle 1014. For a non-limiting example, the first portion 1008 of the ferrite layer assembly 1004 can overlap the first coil section 1016, and the second ferrite portion 1010 can overlap the second coil section 1018. In one embodiment, the ferrite layer assembly 1004 includes two or more tiles defining a gap between the first and second ferrite portions.

In some embodiments, the first and second portions 1008, 1006 of the ferrite layer assembly 1004 may define a gap 1012 therebetween. The gap 1012 can provide a way to form a curved or folded charging pad 1001. In one aspect, the ferrite layer can be formed by flat tiles covering first and second ferrite portions 1008, 1010 with no ferrite material therebetween covering the gap 1007. Accordingly, utilizing the gap 1012 can be a way to avoid using non-flat ferrite tiles. Non-flat ferrite tiles may increase complexity and costs and reduce structural integrity. Accordingly, the gap 1012 may reduce costs, simplify manufacturing, and improve robustness.

The gap 1012 may impact coupling with a wireless field. Compensation for gap 1012 can be accomplished in some embodiments by including additional ferrite material. In one embodiment, the thickness of at least some portions of the first and second ferrite portions 1008, 1010 can be increased in a manner similar to the gap compensation described in connection with FIG. 8. Additionally or alternatively, an additional portion of ferrite layer may be included to be situated in the gap 1012, as described in greater detail in connection with FIG. 11B.

Figure 11A:
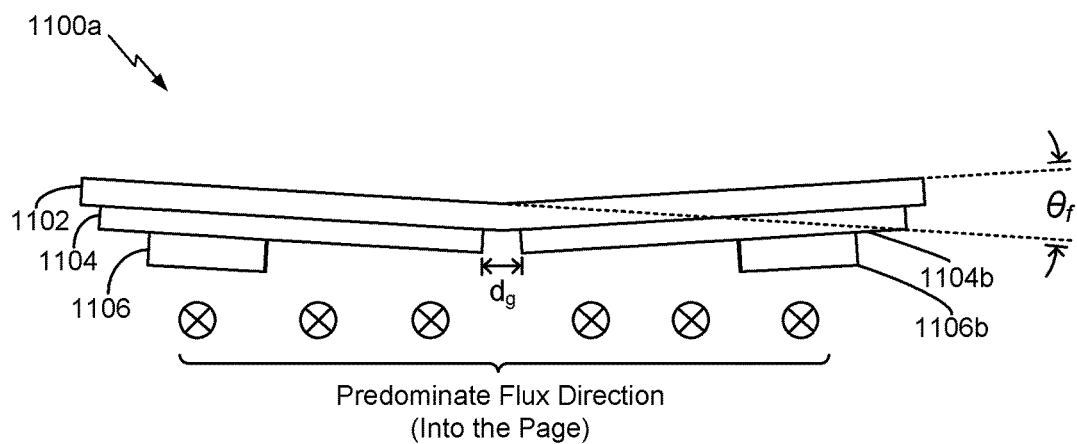
FIGS. 11A and 11B are side-views of charging pads, in accordance with example embodiments.

FIG. 11A is a side-view of a charging pad 1100a, in accordance with an example embodiment. The charging pad 1100a can include a shielding layer 1102, a ferrite layer assembly having first and second ferrite portions 1104a, 1104b, and an antenna assembly having first and second antenna portions 1106a, 1106b. The first and second ferrite portions 1104a, 1104b may be separated by define a channel or gap extending along a fold axis with a width $d_g$. The charging pad 1100a can be configured to mount to a host device, such as an underside of a vehicle having a non-flat mounting area.

In certain embodiments, the gap between the first and second ferrite portions 1104a, 1104b can be aligned with the predominate flux direction to be received by the charging pad 1100a. For example, the illustrated embodiment includes the antenna assembly configured to receive a wireless field of flux predominately directed, e.g., into the page of FIG. 11A. Accordingly, the gap between the first and second ferrite portions 1104a, 1104b is aligned in the predominate flux direction of the charging pad 1100a. Aligning the gap between the first and second ferrite portions 1104a, 1104b (and the fold of the charging pad 1100a) with the predominate flux direction of the charging pad 1100a can be advantageous in one aspect because the gap may not significantly impact coupling with the wireless field in a way that renders the charging pad 1100*a* ineffective for charging and/or powering. When the fold axis of the charging pad 1100*a* creates a large angle (e.g., greater than about 30 degrees) with the predominate flux direction, the gap between the first and second ferrite portions 1104*a*, 1108 along the fold may significantly reduce magnetic coupling and increase losses. Accordingly, some embodiments of the charging pad 1100*a* may include an optional piece of ferrite material configured to fit in the space of the gap 1012 to improve wireless power transfer, as described in greater detail below in connection with FIG. 11B.

Figure 11B:
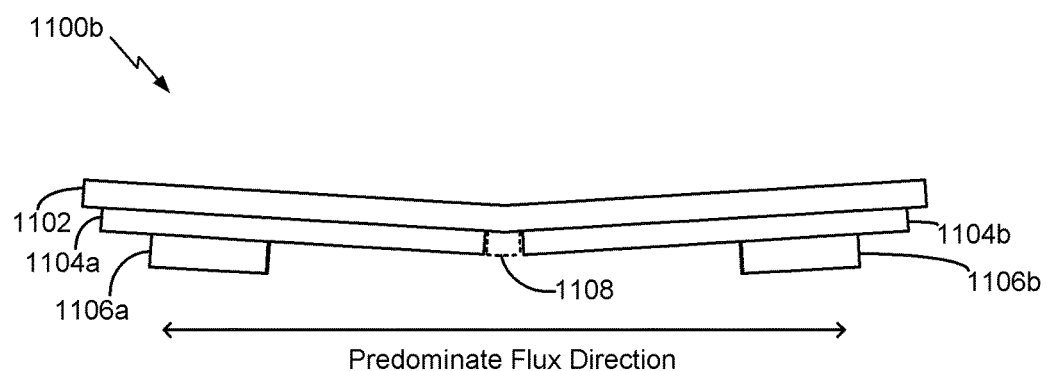

FIG. 11B is a side-view of a charging pad 1100*b*, in accordance with an example embodiment. The charging pad 1100*b* can include a shielding layer 1102, a ferrite layer assembly having first and second ferrite portions 1104*a*, 1104*b*, and an antenna assembly having first and second antenna portions 1106*a*, 1106*b*. The first and second ferrite portions 1104*a*, 1104*b* may be separated and define a channel or gap extending along a fold axis. The charging pad 1100*b* may further include an optional piece of ferrite 1108 situated in the gap between the first and second ferrite portions 1104*a*, 1104*b*. The charging pad 1100*b* can be configured to mount to a host device, such as an underside of a vehicle having a non-flat mounting area.

In one aspect, the charging pad 1100*b* can be configured to receive a wireless fields having a predominate flux direction that is parallel and/or not parallel with the fold of the charging pad 1100*b*. For a particular example, the illustrated embodiment of FIG. 11B shows the predominate flux direction orientated perpendicularly to the fold of the charging pad 1100*b*. In such case, a gap without ferrite material between the first and second ferrite portions 1104*a*, 1104*b* may interfere with coupling to a wireless field and may cause the charging pad to 1100*b* to be ineffective. Accordingly, the optional piece of ferrite 1108 may aid in coupling with a wider variety of orientations between the charging pad 1100*b* and a base pad.

Figure 12:
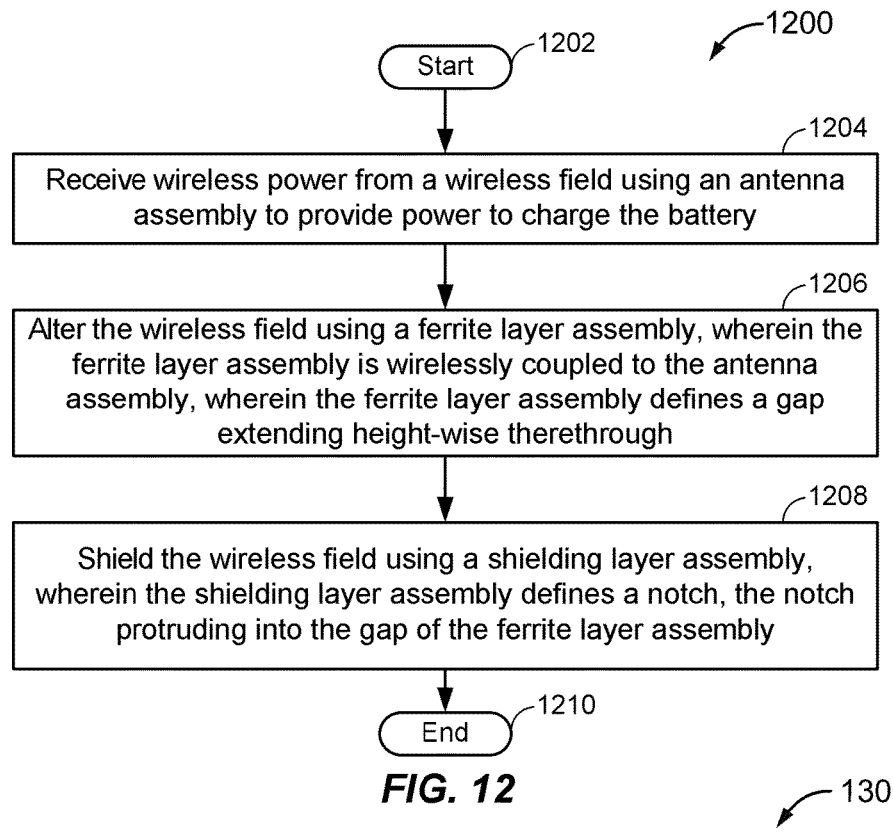
FIG. 12 is a flowchart of an implementation of a method of receiving wireless power, in accordance with an embodiment.

FIG. 12 is a flowchart of an implementation of a method 1200 of receiving wireless power and/or charging a battery based on received wireless power, in accordance with an embodiment. The method 1200 starts at block 1202 and proceeds to block 1204 receiving wireless power from a wireless field using an antenna assembly to provide power to charge the battery. For example, one embodiment of the antenna assembly can correspond to the antenna assembly 306 of FIG. 3. The wireless power may be generated by a base pad. The antenna assembly may receive wireless power from the base pad by magnetically coupling with the base pad.

Upon receiving wireless power, the method 1200 can continue to block 1206 for altering the wireless field using a ferrite layer assembly. The ferrite layer assembly can be wirelessly coupled to the antenna assembly. The ferrite layer assembly can define a gap extending height-wise therethrough. In one embodiment, the ferrite layer assembly can correspond to the ferrite layer assembly 304 of FIG. 3. The ferrite layer assembly can include material having substantially high magnetic permeability for guiding, altering, shaping, and/or enhancing the magnetic field received by the power antenna assembly. For example, the ferrite layer assembly can include one contiguous magnetically permeable material, such as but not limited to ferrites, or a plurality of tiles of magnetically permeable material.

In addition, upon receiving wireless power, the method 1200 proceeds to block 1208 for shielding the wireless field using a shielding layer assembly. The shielding layer assembly defines a notch, the notch protruding into the gap of the ferrite layer assembly. In one embodiment, the shielding layer assembly can correspond to the shielding layer 302 of FIG. 3. The notch can be configured to receive a mechanical part the electric vehicle. The method 1200 can end at block 1210.

Figure 13:
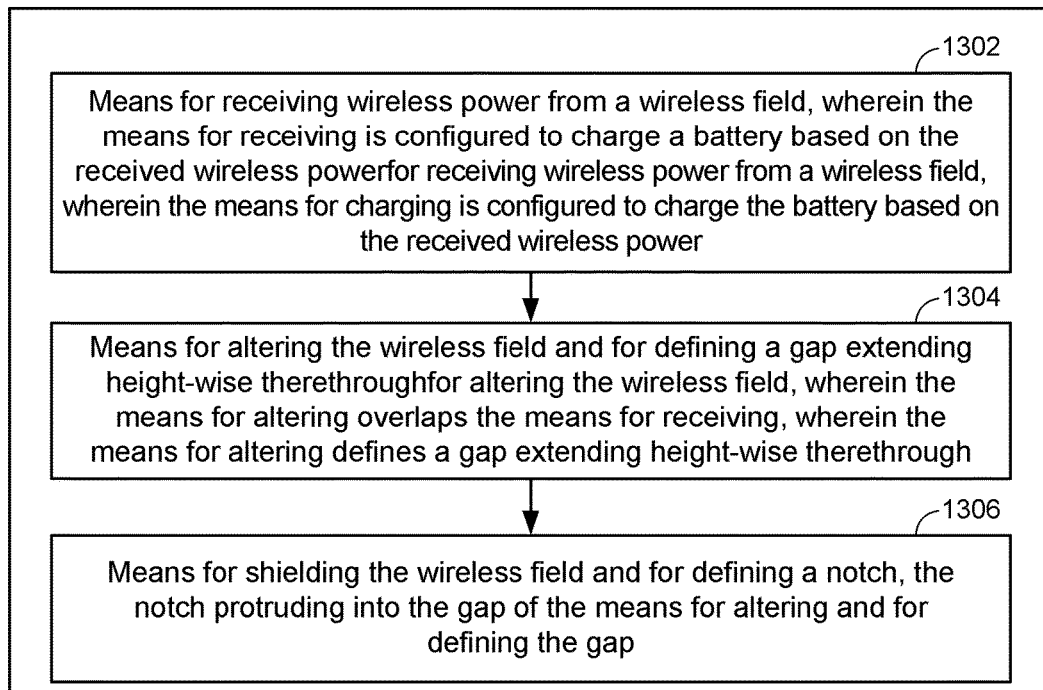
FIG. 13 is a functional block diagram of a wireless power receiver, in accordance with an exemplary embodiment.

FIG. 13 is a functional block diagram of a wireless power receiver, in accordance with an exemplary embodiment. The wireless power receiver 1300 comprises means 1302, 1304, and 1306 for the various actions discussed with respect to FIGS. 1-12. In an aspect, the various operations of methods described above may be performed by any suitable means capable of performing the operations, such as various hardware and/or software component(s), circuits, and/or module(s). Generally, any operations illustrated in the figures may be performed by corresponding functional means capable of performing the operations. For example, means for receiving wireless power may be provided by the antenna assembly 306 of FIG. 3; means for altering the wireless field may be provided using the ferrite layer assembly 304 of FIG. 3; and means for shielding the wireless field may be provided by shielding layer 302 of FIG. 3.

Figure 14:
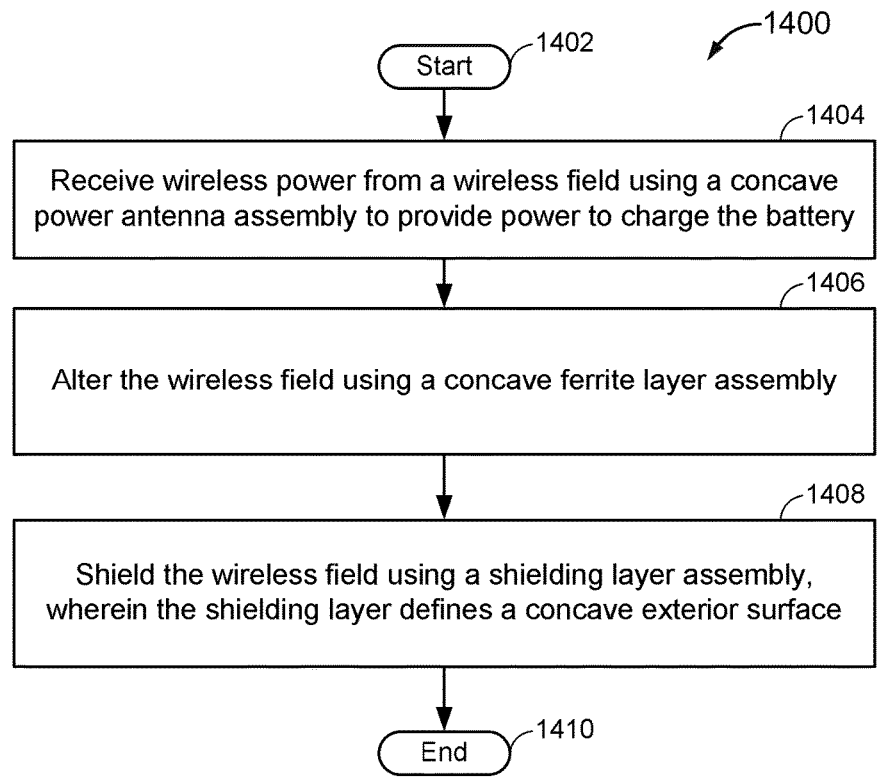
FIG. 14 is a flowchart of an implementation of a method of receiving wireless power, in accordance with an embodiment.

FIG. 14 is a flowchart of an implementation of a method 1400 of receiving wireless power and/or charging a battery based on received wireless power, in accordance with an embodiment. The method 1400 starts at block 1402 and proceeds to block 1404 for receiving wireless power from a wireless field using a concave power antenna assembly to provide power to charge the battery. For example, one embodiment of the antenna assembly can correspond to the antenna assembly 1006 of FIG. 10. The wireless power may be generated by a base pad. The antenna assembly may receive wireless power from the base pad by magnetically coupling with the base pad.

Upon receiving wireless power, the method 1400 can continue to block 1406 for altering the wireless field using a concave ferrite layer assembly. In one embodiment, the ferrite layer assembly can correspond to the ferrite layer assembly 1004 of FIG. 10. The ferrite layer assembly can include material having substantially high magnetic permeability for guiding, altering, shaping, and/or enhancing the magnetic field received by the power antenna assembly. For example, the ferrite layer assembly can include one contiguous magnetically permeable material, such as but not limited to ferrites, or a plurality of tiles of magnetically permeable material.

In addition, upon receiving wireless power, the method 1400 proceeds to block 1408 for shielding the wireless field using a shielding layer assembly. The shielding layer defines a concave exterior surface. In one embodiment, the shielding layer assembly can correspond to the shielding layer 1002 of FIG. 10. The concave exterior can be configured to integrate with a non-flat surface of a host device, such as a vehicle. The method 1400 can end at block 1410.

Figure 15:
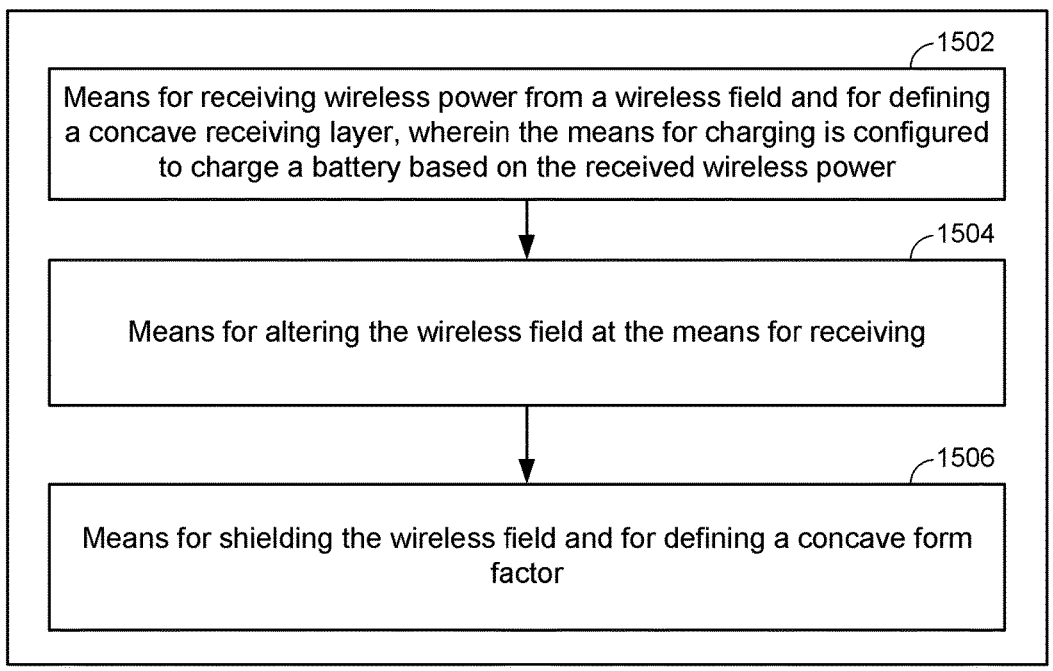
FIG. 15 is a functional block diagram of a wireless power receiver, in accordance with an exemplary embodiment.

FIG. 15 is a functional block diagram of a wireless power receiver, in accordance with an exemplary embodiment. The wireless power receiver 1500 comprises means 1502, 1504, and 1506 for the various actions discussed with respect to FIGS. 1-12 and 14. In an aspect, the various operations of methods described above may be performed by any suitable means capable of performing the operations, such as various hardware and/or software component(s), circuits, and/or module(s). Generally, any operations illustrated in the figures may be performed by corresponding functional means capable of performing the operations. For example, means for receiving wireless power may be provided by the antenna assembly 1006 of FIG. 10; means for altering the wireless field may be provided using the ferrite layer assembly 1004 of FIG. 10; and means for shielding the wireless field may be provided by shielding layer 1002 of FIG. 10.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device for receiving power wirelessly, comprising:
   a power antenna assembly configured to receive wireless power from a transmit antenna, the power antenna assembly defining a first gap extending from a first surface to a second surface of, and through, the power antenna assembly, the first surface opposite the second surface, the power antenna assembly further configured to charge a battery based on the received wireless power;
   a ferrite layer assembly defining a second extending from a first surface to a second surface of, and through, the ferrite layer assembly, the first surface opposite the second surface, wherein the ferrite layer assembly surrounds the second gap on all sides in a plane shared by the ferrite layer assembly and the second gap; and
   a shielding layer configured to shield components other than the power antenna assembly and the ferrite layer assembly from the wireless power of the transmit antenna, the shielding layer protruding into the second gap, defining a cavity, the cavity also protruding into the second gap, and separating the first gap from the second gap.

2. The device of claim 1, wherein the cavity corresponds to a protrusion on an exterior surface to which the shielding layer attaches.

3. The device of claim 1, wherein the power antenna assembly comprises:
   a first coil wound in a first direction;
   a second coil coplanar with the first coil and wound in a second direction opposite the first direction; and
   a third coil at least partially overlapping the first coil and at least partially overlapping the second coil,
   wherein the second gap extends longitudinally along a center line of the third coil.

4. The device of claim 1, wherein a width of the second gap is about 5% to about 30% of an inner width of a coil antenna of the antenna assembly.

5. The device of claim 1, wherein a length of the second gap is less than about 90% of an inner length of a coil antenna of the antenna assembly.

6. The device of claim 1, wherein the power antenna assembly is configured to receive a wireless flux in a predominate direction, wherein the cavity is aligned longitudinally with the predominate direction of the wireless flux.

7. The device of claim 1, wherein the ferrite layer forms a channel extending from the second gap, wherein the channel has a width less than a width of the second gap.

8. The device of claim 1, wherein:
the ferrite layer forms a channel extending from the second gap;
the channel has a width less than a width of the second gap; and
the channel is configured to house power lines of the power antenna assembly.

9. The device of claim 1, wherein the power antenna assembly comprises a circular coil antenna configured to receive wireless flux in a substantially uniformly radial direction.

10. The device of claim 1, wherein the power antenna assembly comprises a circular coil antenna configured to receive wireless flux in a substantially radial direction, wherein the second gap is substantially radially symmetric.

11. The device of claim 1, wherein the shielding layer is configured to mechanically couple to a vehicle, the vehicle comprising the battery chargeable by the power antenna assembly.

12. The device of claim 1, wherein the shielding layer is configured to mechanically couple to a vehicle, wherein the cavity of the shielding layer is configured to receive a protruding member of the vehicle.

13. The device of claim 1, wherein the shielding layer is configured to mechanically couple to a vehicle, wherein the cavity of the shielding layer is configured to receive a movable member of the vehicle.

14. The device of claim 1, wherein the ferrite layer comprises two or more tiles defining the second gap.

15. A device for wireless power transfer, the device comprising:
means for receiving wireless power from a wireless field generated by a transmit antenna, the means for receiving defining a first gap extending from a first surface to a second surface of, and through, the means for receiving wireless power, the first surface opposite the second surface and the means for receiving wireless power configured to charge a battery based on the received wireless power;
means for altering the wireless field defining a second gap extending from a first surface to a second surface of, and through, the means for altering, the first surface opposite the second surface, wherein the means for altering surrounds the second gap on all sides in a plane shared by the ferrite layer and the second gap; and
means for shielding means other than the means for receiving and the means for altering from the wireless field generated by the transmit antenna, the means for shielding protruding into the second gap, defining a cavity, the cavity also protruding into the second gap, and separating the first gap from the second gap.

16. The device of claim 15, wherein the means for receiving comprises:
a first coil wound in a first direction;
a second coil coplanar with the first coil and wound in a second direction opposite the first direction; and
a third coil at least partially overlapping the first coil and at least partially overlapping the second coil,
wherein the second gap extends longitudinally along a center line of the third coil.

17. The device of claim 15, wherein the means for receiving is configured to receive a wireless flux in a predominate direction, and the cavity is aligned longitudinally with the predominate direction of the wireless flux.

18. The device of claim 15, wherein the means for shielding and for defining the cavity is configured to mechanically couple to a vehicle, and the cavity is configured to receive a protruding member of the vehicle.

19. A method of charging a battery via a charging pad, the method comprising:
receiving wireless power from a wireless field, generated by a transmit antenna, using an antenna assembly to provide power to charge the battery, the antenna assembly defining a first gap extending from a first surface to a second surface of, and through, the antenna assembly, the first surface opposite the second surface;
altering the wireless field using a ferrite layer, the ferrite layer wirelessly coupled to the antenna assembly, the ferrite layer defining a second gap extending from a first surface to a second surface of, and through, the ferrite layer, the first surface opposite the second surface, wherein the ferrite layer surrounds the second gap on all sides in a plane shared by the ferrite layer and the second gap; and
shielding components other than the antenna assembly and the ferrite layer from the wireless field generated by the transmit antenna using a shielding layer, wherein the shielding layer protrudes into the second gap, defines a cavity, the cavity also protruding into the second gap, and separating the first gap from the second gap, the charging pad comprising the antenna assembly, the ferrite layer, and the shielding layer.

20. The method of claim 19, wherein the antenna assembly comprises:
a first coil wound in a first direction;
a second coil coplanar with the first coil and wound in a second direction opposite the first direction; and
a third coil formed on a plane separate from the second and first coil and at least partially covering the first coil and at least partially covering the second coil,
wherein the second gap extends longitudinally along a center line of the third coil.

21. The method of claim 19, wherein the antenna assembly is configured to receive a wireless flux in a predominate direction, and the cavity is aligned longitudinally with the predominate direction of the wireless flux.

22. The method of claim 19, wherein the charging pad is mechanically coupled to a vehicle, and the cavity of the shielding layer is configured to receive a protruding member of the vehicle.

23. A device for receiving power wirelessly via a wireless field generated by a transmit antenna, comprising:
a shielding layer having a concave shape facing and positioned below a non-planar mounting surface;
a concave ferrite layer assembly having a concave shape facing and positioned below the shielding layer, the ferrite layer comprising at least a first ferrite portion having a first surface that defines a first plane and a second ferrite portion having a second surface that defines a second plane that is not coplanar with the first plane, wherein the first and second planes intersect with a non-zero angle; and
a concave power antenna assembly having a concave shape facing and positioned below the concave ferrite layer, the concave power antenna assembly comprising a first power antenna portion having a third surface that defines a third plane and a second power antenna portion having a fourth surface that defines a fourth plane, wherein the third and fourth planes intersect with the non-zero angle, and configured to receive wireless power and to charge a battery based on the received wireless power, the shielding layer configured to shield components other than the ferrite layer and the power antenna assembly from the wireless field of the transmit antenna.

24. The device of claim 23, wherein the concave power antenna assembly includes at least one coil having a fold along an axis such that the at least one coil has a first coil section formed along a first plane and a second coil section formed along a second plane not coplanar with the first plane.

25. The device of claim 24, wherein the first ferrite portion is configured to wirelessly couple to the first coil section, wherein the second ferrite portion is configured to wirelessly couple to the second coil section, and wherein the first ferrite portion and second ferrite portion define a gap.

26. The device of claim 25, wherein the gap extends along the fold, wherein the concave power antenna assembly is configured to receive wireless power from a wireless field aligned with the fold.

27. The device of claim 25, wherein the ferrite layer further comprises a third ferrite portion, wherein the ferrite layer defines a gap through the ferrite layer and extending along the fold, wherein the third ferrite portion is at least partially within the gap.

28. A method of charging a battery, the method comprising:
shielding components other than a concave ferrite layer assembly and a concave power antenna assembly from a wireless field, generated by a transmit antenna, using a shielding layer having a concave shape facing and positioned below the non-planar mounting surface, the ferrite layer comprising at least a first ferrite portion having a first surface that defines a first plane and a second ferrite portion having a second surface that defines a second plane that is not coplanar with the first plane, wherein the first and second planes intersect with a non-zero angle, the power antenna assembly comprising a first power antenna portion having a third surface that defines a third plane and a second power antenna portion having a fourth surface that defines a fourth plane, wherein the third and fourth planes intersect with the non-zero angle;
altering the wireless field using the concave ferrite layer having a concave shape facing and positioned below the shielding layer; and
receiving wireless power from the wireless field using the concave power antenna assembly having a concave shape facing and positioned below the ferrite layer, the power antenna assembly configured to provide power to charge the battery.

29. The method of claim 28, wherein receiving wireless power comprises receiving wireless power using at least one coil having a fold along an axis such that the at least one coil has a first coil section formed along a first plane and a second coil section formed along a second plane not coplanar with the first plane.

30. The method of claim 29, wherein altering the first ferrite portion is wirelessly coupled to the first coil section and the second ferrite portion is wirelessly coupled to the second coil section, wherein the first ferrite portion and second ferrite portion define a gap.

31. The method of claim 29, wherein altering the wireless field comprises altering the wireless field using a first ferrite portion wirelessly coupled to the first coil section and a second ferrite portion wirelessly coupled to the second coil section, wherein the first ferrite portion and second ferrite portion define a gap extending along the fold, wherein the wireless field is aligned with the fold.

32. The method of claim 29, wherein altering the wireless field comprises altering the wireless field using a first ferrite portion wirelessly coupled to the first coil section, a second ferrite portion wirelessly coupled to the second coil section, and a third ferrite portion at least partially within a gap defined between the first ferrite portion and second ferrite portions.

33. A device for receiving wireless power, the device comprising:
means for shielding an electric vehicle from a wireless field, generated by a transmit antenna, having a concave shape facing and positioned below a non-planar mounting surface;
means for altering the wireless field having a concave shape facing and positioned below the means for shielding, the means for altering comprising at least a first ferrite portion having a first surface that defines a first plane and a second ferrite portion having a second surface that defines a second plane that is not coplanar with the first plane, wherein the first and second planes intersect with a non-zero angle; and
means for receiving wireless power from the wireless field having a concave shape facing and positioned below the means for altering, the means for receiving comprising a first portion having a first surface that defines a third plane and a second portion having a second surface that defines a fourth plane, wherein the third and fourth planes meet at the non-zero angle, and configured to charge a battery based on the received wireless power, the means for shielding configured to shield components other than the means for altering the wireless field and the means for receiving wireless power from the wireless field of the transmit antenna.

34. The device of claim 33, wherein the means for receiving comprises at least one coil having a fold along an axis such that the at least one coil has a first coil section formed along a first plane and a second coil section formed along a second plane not coplanar with the first plane.

35. The device of claim 34, wherein the first ferrite portion is configured to wirelessly couple to the first coil section and the second ferrite portion is configured to wirelessly couple to the second coil section, wherein the first ferrite portion and second ferrite portion define a gap.

36. The device of claim 34, wherein the first ferrite portion is configured to wirelessly couple to the first coil section and the second ferrite portion is configured to wirelessly couple to the second coil section, wherein the first ferrite portion and second ferrite portion define a gap extending along the fold, wherein the means for receiving is configured to receive wireless power from a wireless field aligned with the fold.

37. The device of claim 34, wherein the first ferrite portion is configured to wirelessly couple to the first coil section, the second ferrite portion is configured to wirelessly couple to the second coil section, and a third ferrite portion at least partially within a gap defined between the first ferrite portion and second ferrite portions.

38. The device of claim 1, wherein the shielding layer defining a cavity comprises forming the cavity such that at least a portion of the shielding layer extends into the gap of the ferrite layer.

39. The device of claim 15, wherein the means for shielding the wireless field and for defining a cavity comprises forming the cavity such that at least a portion of the means for shielding the wireless field and for defining a cavity extends into the gap of the means for altering the wireless field.

40. The method of claim 19, wherein at least a portion of the shielding layer extends into the gap of the ferrite layer.

\* \* \* \* \*